United States Patent Office 3,089,763
Patented May 14, 1963

3,089,763
COATED ABRASIVES
Matthew T. Gladstone, Scotia, N.Y., assignor to Norton Company, Troy, N.Y., a corporation of Massachusetts
No Drawing. Filed Dec. 2, 1959, Ser. No. 856,669
1 Claim. (Cl. 51—295)

This invention relates to an improved flexible coated abrasive sheet. In particular, it relates to a flexible abrasive sheet employing a novel bonding resin.

In certain applications of coated abrasives a high degree of flexibility and conformability is desirable. The achievement of a sufficient flexibility in certain types of abrasive sheets, such as waterproof and solvent-resistant sheets for sanding with the aid of water or other liquid has always presented a difficult problem in the selection of a suitable bonding agent for the abrasive grains. Phenolic resins, for example, have been satisfactory for certain types of products where flexibility is not an important consideration. In such applications where flexibility and conformability of the coated abrasive product are required it has been necessary, prior to my invention, to resort to the use of bonding agents such as varnishes or synthetic resins, which while more flexible than phenolic resins lack the tensile and toughness properties of phenolics, resulting in a loss of bonding or holding strength of the adhesive and a consequent reduction in the durability and sharpness of the abrasive product.

It is therefore an object of my invention to provide a coated abrasive sheet of improved flexibility combined with durability and sharpness.

It is a further object to provide a superior coated abrasive with improved curling characteristics and non-loading properties.

It is a still further object to provide a coated abrasive with a bonding agent having a high degree of water insensitivity.

Other objects of my invention will become apparent from the detailed description which follows.

In practice, in order to form a satisfactory coated abrasive sheet, it has been found necessary, in most cases, to provide first a maker coat of adhesive on the cloth or paper coated abrasive backing material, next to apply abrasive grain to the maker coat and, finally to apply a grit-size coat to firmly bond the grain on the backing.

I have discovered that by the use of a grit-size of an amine catalyzed phenolic resin having included therein a modifying agent chosen from a specific group of polyoxyalkylene compounds, an abrasive sheet having improved flexibility combined with outstanding abrading efficiency can be formed.

It has been generally known in the bonded abrasive art to use polyoxyalkylene compounds with phenolic resins to soften the bond between the grain and the resin in the bonded abrasive product. Such teachings are disclosed in U.S. 2,860,960. I have found that while the polyoxyalkylene addition alone softens the bond, it also somewhat weakens it. The simple addition of an aliphatic amine alone appears to have no effect on tensile strength or flexibility of the adhesive. However, the combination of specific polyoxyalkylene compounds, described below, with aliphatic amine catalyzed thermosetting phenolic resins results in an adhesive with remarkable improvement in flexibility with no reduction in tensile strength.

The modifying agents useful in my invention are described in U.S. Patent 2,674,619. These compounds are commercially available and are sold by Wyandotte Chemicals Corporation, under the name "Pluronics." These compounds are formed by reacting ethylene oxide or its equivalent with a hydrophobic base formed by the reaction of propylene oxide with propylene glycol or similar active hydrogen containing compounds.

The thus formed polyoxyalkylene compounds which I have found useful in my invention have a molecular weight of 2,000 to 3,000, the hydrophobic base unit of the molecule has a molecular weight of 1,200 to 2,250 and the hydrophilic substituent may vary beween 10 to 40% of the weight of the total.

The phenolic resins useful in conjunction with the polyoxyalkylene compositions are amine catalyzed reaction products of phenolic compounds and an aldehyde. Such products are commercially available from chemical manufacturers, or may be prepared according to the following procedure.

*Example I.—Preparation of Phenolic Precondensate*

Phenol (synthetic)—1 mol (94 g.)
Formaldehyde (37% by weight, aqueous solution)—1.5 mols (122 g.)
Diethyl amine—3% by weight based on phenol The phenol, formaldehyde and aliphatic amine catalyst are placed in a reaction vessel equipped with a heater, reflux condenser and stirring mechanism. The reactants are heated to reflux conditions and held under these conditions for 90 to 135 minutes. At the end of the refluxing period a vacuum is applied and water of solution and hydration is removed with the volatile material to yield a solution of approximately 79% solids. This phenolic precondensate has the following physical properties:

Viscosity—24,000–50,000 cps. (at 77° F.)
Water tolerance—23–26 cc./100 g. resin
Gel time—5–6 min. (G.E.)
pH—7.7–8.0

Instead of the resin prepared as above, I may use commercially prepared amine catalyzed phenolics such as EA-227, sold by Reichhold Chemicals, Inc. and catalyzed with dimethylamine. This resin has the following properties:

Solids—76.8%
Viscosity—20,000 cps. (at 77° F.)
Water tolerance—15 cc./100 g. resin
Gel time—7.3 min. (G.E.)
pH—7.8

The amount of aliphatic amine employed in forming the resin may be varied from 0.02 to 0.2 equivalents of nitrogen per total mols of phenol and formaldehyde (or in general approximately 1 to 10% of amine based on the weight of phenol). The amines useful in the reaction must contain at least one primary or secondary amine group and must be water soluble. For example, the water soluble lower aliphatic mono or poly amines are suitable.

In preparing a liquid phenolic resin suitable for this invention, other reactive phenolic components, such as 3,5,xylol, m-cresol and m-chlorophenol may be employed instead of phenol. In each case the mold ratio of the phenol to formaldehyde should be 1 to 1.5; however, the ratios may vary from 1 to 1.1 to 1 to 2.4.

In order to take full advantage of the flexibility imparted to coated abrasive products by the use of the specially prepared phenolic resins of my invention it is preferable to employ flexible backing materials in the manufacture of the sheet. Furthermore, in order to take advantage of the extreme toughness, tensile strength and water and solvent resistance of the novel resin, it is preferable to employ backing materials which are relatively durable and also water and solvent resistant. For this reason I prefer to employ paper specially treated to produce strength and resistance to solvents for the backing member. Similarly, the maker resin, to take full advantage of the solvent and water resistance of the size coat, should be a solvent and water resistant material. Such backings and maker adhesives are well known to those skilled in the coated abrasive art.

The following is a description of the manufacture of coated abrasives according to the preferred forms of my invention:

(1) Backing: A suitable backing is a bleached kraft paper having a weight of 28.5–35 lbs./ream and treated with a butadiene-acrylonitrile rubbery copolymer to impart wear resistance and solvent resistance, backsized with an oil modified phenolic and sized on the coat side with vinyl chloride and butadiene-acrylonitrile rubber.

(2) Maker adhesive: A suitable maker adhesive consists of one part of an Epon ester made from Epon 1004 (Shell Chemical Co.) and dehydrated castor oil fatty acids plus one part of a glyceryl phthalate alkyd resin thinned with an aromatic solvent such as High Flash Naphtha to the desired solids content and to which an appropriate amount (0.025% manganese based on oil solids) of manganese napthenate drier is added. In lieu of the above an oil modified phenol aldehyde condensation product or an oil modified alkyd resin which is pentaerythritol based may be employed.

The backing element is coated with a maker adhesive to the extent of about 0.7#/ream. Abrasive grain is applied to the maker coat by gravity or by electrostatic coating methods known in the art. The amount of maker coat, and type and grade of abrasive grain employed depends upon the particular product desired. With a close-coat #320 grit abrasive I would employ 0.7#/ream of adhesive and about 3.5#/ream of grain.

After the maker coat is sufficiently hardened to permit application of the size coat, the size coat is applied in an amount depending upon the particular size of the abrasive grain employed. For example, with a closecoat of #320 silicon carbide grain I would employ from 3.5 to 3.9#/ream of adhesive solution.

Finally, the product is cured under the influence of heat until the resin of the maker and size reach the desired point of cure. I find that the size coat of my invention can be cured in air at temperatures of 175° F. to 250° F. for 20 to 2 hours. This is a relatively low temperature cure when compared to the temperature required for most phenolic adhesives of the prior art when employed as bonding agents in the manufacture of coated abrasives.

In preparing the novel adhesive of my invention, I find that I may add from 10 to 25 weight percent of polyoxyalkylene agent, based on the total resin solids. Upon mixing the amine catalyzed phenolic resin and the polyoxyalkylene agent to obtain a homogeneous mass and a suitable solvent (such as propanol mixed with water) to reduce the viscosity to the desired coating consistency, the composition is ready to be coated.

As an example of the preparation of the phenolic adhesive of my invention I may employ:

100 lbs. of an amine catalyzed phenolic precondensate such as described under Example I above; and 10.5 lbs. of a polyoxyalkylene composition such as described above (e.g. Pluronic L–72 sold by Wyandotte Chemicals Company, New York, New York).

The exact reason for the superior physical properties and water insensitivity of the amine catalyzed modified phenolic when used as a grit bonding agent in flexible coated abrasives is not known. It is probable that the "Pluronic" acts as a plasticizer and probably also reacts with the phenol-aldehyde reaction products. Surprisingly, however, I have found that I do not obtain the superior results of my invention unless an amine catalyst is used in the composition.

Although I have given examples of the novel adhesive of my invention employed as a sand size coating over a resinous maker coat, I may also employ the modified phenolic resin of my invention as a primary bonding coat in making flexible coated abrasives. However, the resin is particularly useful as a size coat in the manufacture of abrasive sheet material used in the presence of water. Because of the extreme water insensitivity of the cured adhesive, there is no tendency of coated products to curl due to absorption or loss of water by the adhesive. Furthermore, there is no significant reduction in the tensile strength and toughness properties of the resin in presence of water, as is the case with unmodified phenolic resins.

I claim:

In a coated abrasive product wherein a layer of abrasive grain is firmly bonded to a waterproof flexible fibrous backing member by a synthetic resin maker adhesive, the improvement comprising a size coat applied over said layer of grains and maker adhesive wherein said size coat consists essentially of a hardened mixture of (1) a phenol-formaldehyde precondensate catalyzed by a water soluble aliphatic amine containing at least one amine group selected from the group consisting of primary and secondary amine groups, and (2) 10 to 25% by weight, based on the total solids, of a condensation product of ethylene oxide and a hydrophobic base formed by the condensation of propylene oxide and propylene glycol having a molecular weight of between 2,000 and 3,000, wherein the molecular weight of said hydrophobic base unit is in the range of from 1,200 to 2,250 and the oxyethylene content of the reaction product varies between 10 and 40% of the total reactants.

References Cited in the file of this patent

UNITED STATES PATENTS

| | | |
|---|---|---|
| 1,907,088 | Novotny | May 2, 1933 |
| 2,236,597 | Hatch | Apr. 1, 1941 |
| 2,357,335 | Kugler et al. | Sept. 5, 1944 |
| 2,627,145 | Frigstad | Feb. 3, 1953 |
| 2,769,700 | Goepfert | Nov. 6, 1956 |
| 2,860,960 | Gregor | Nov. 18, 1958 |
| 2,876,087 | Webber | Mar. 3, 1959 |